Patented Nov. 5, 1929

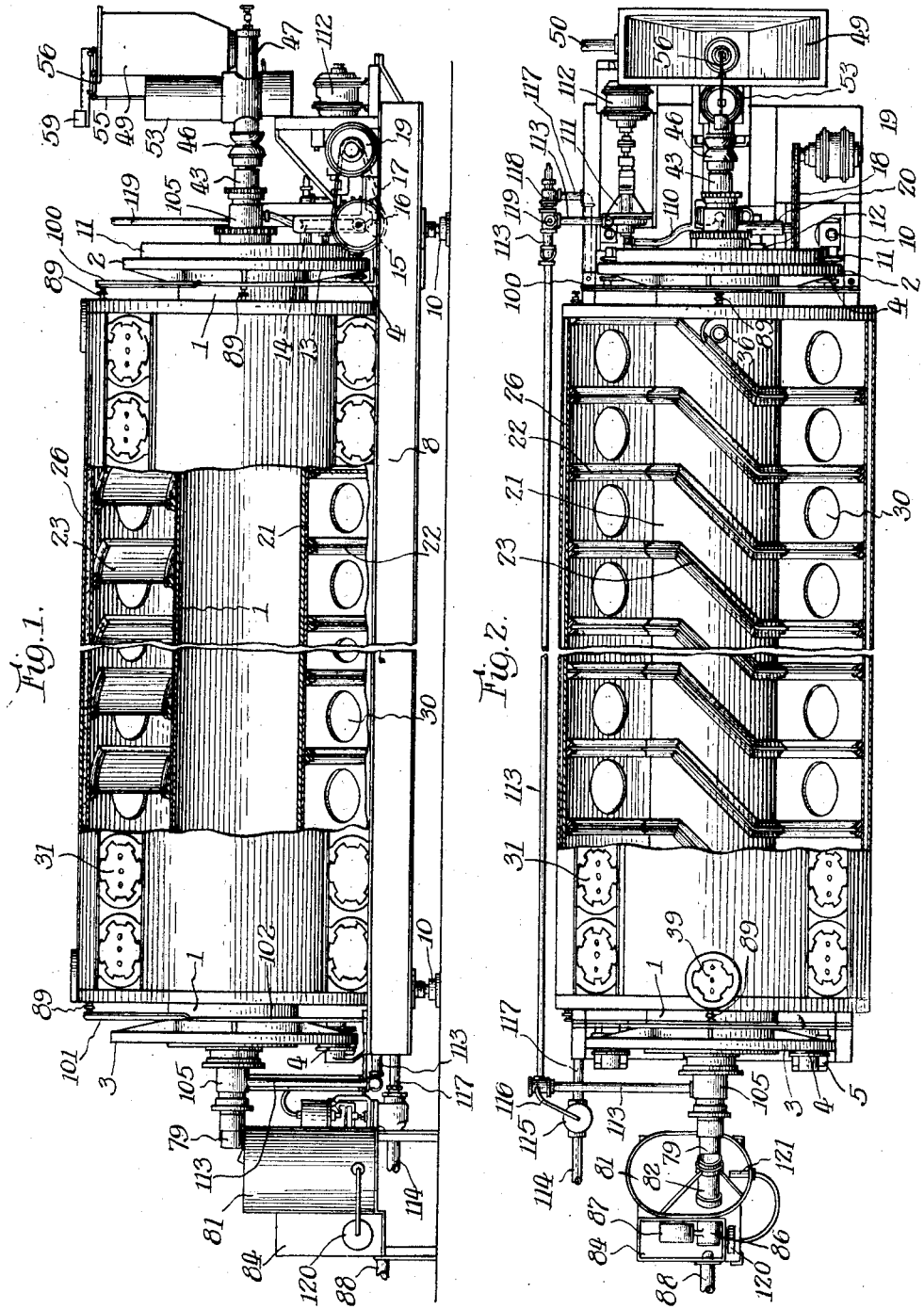

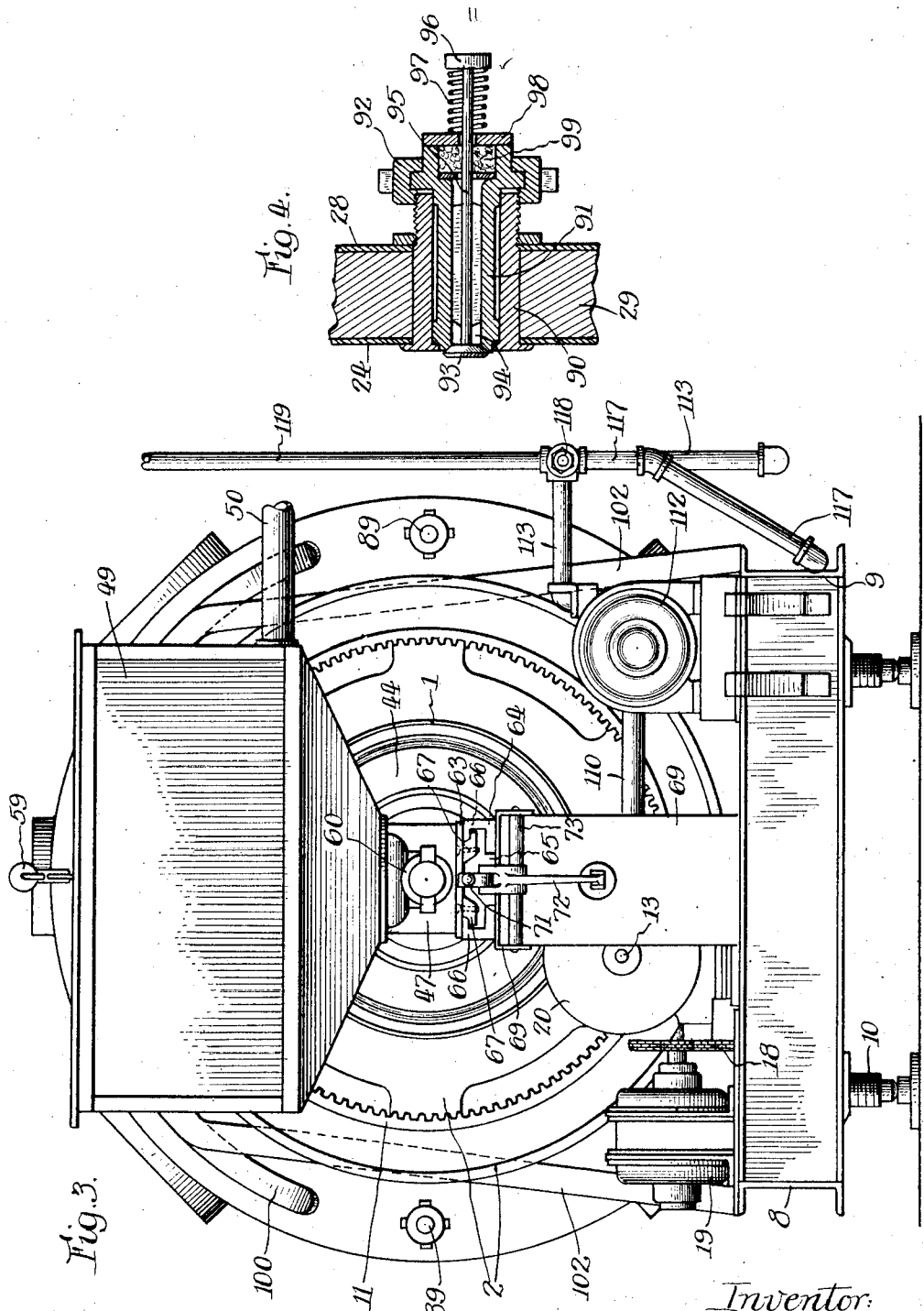

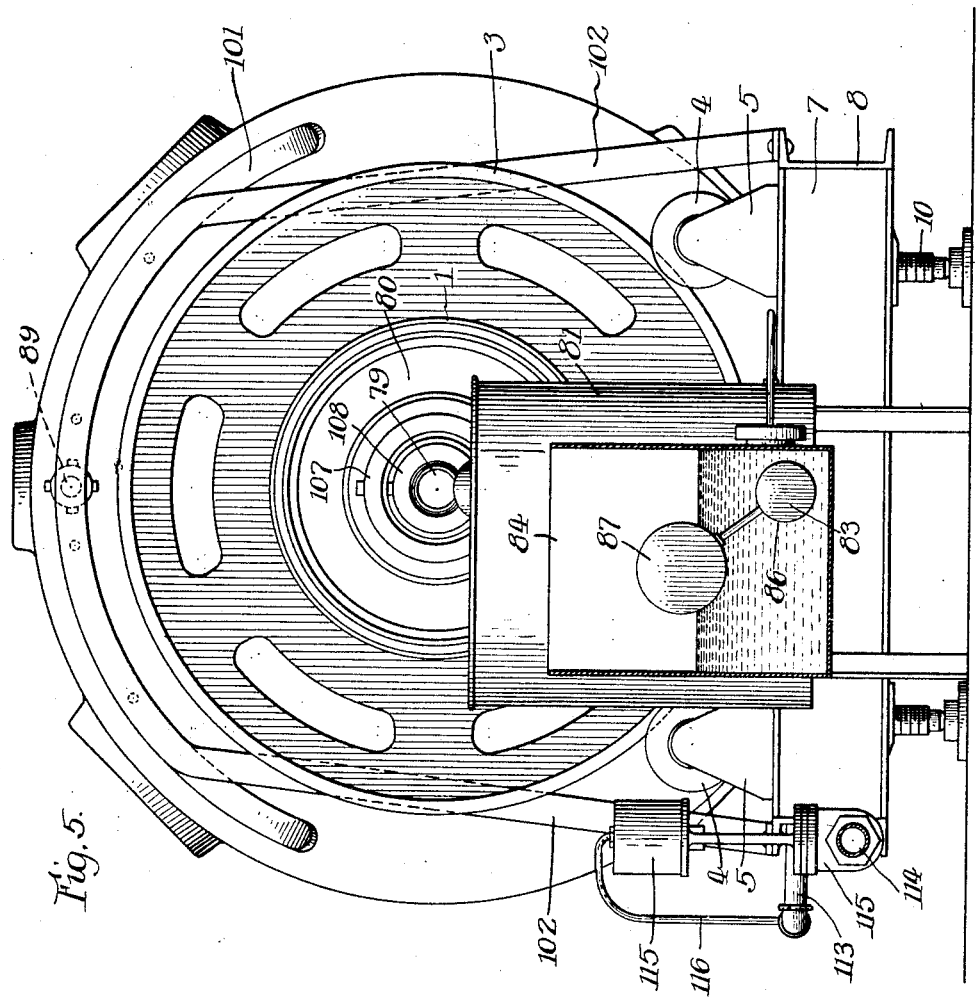

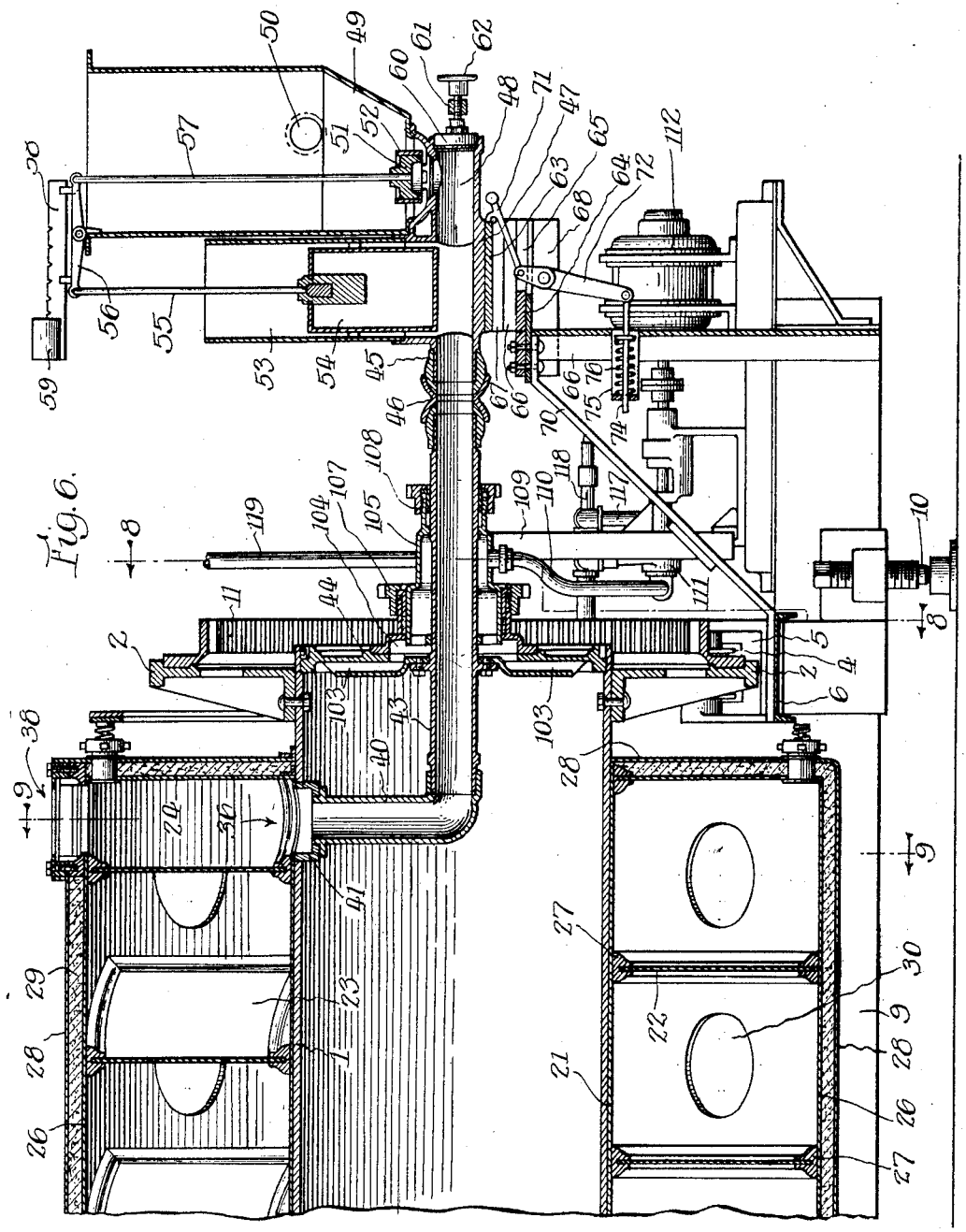

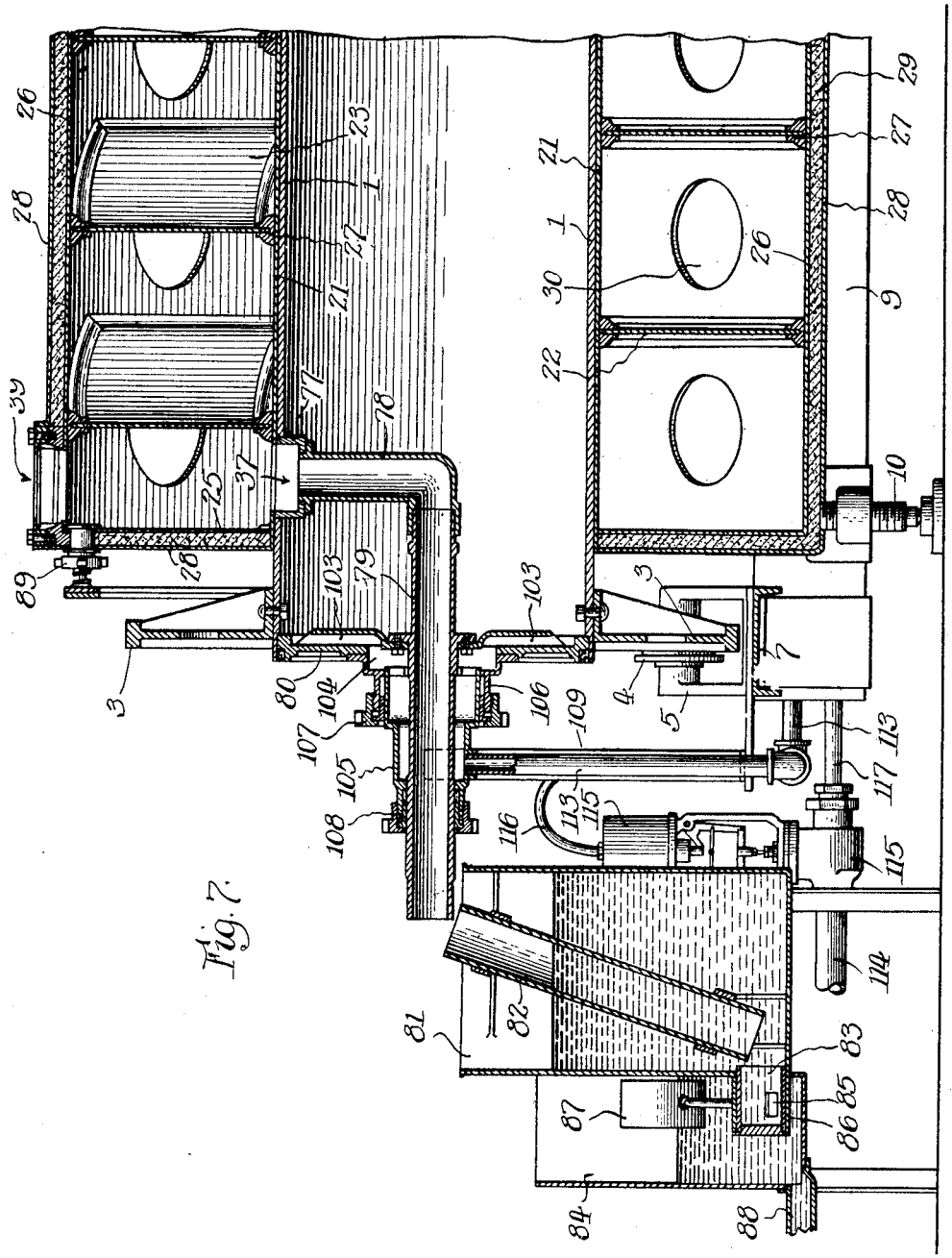

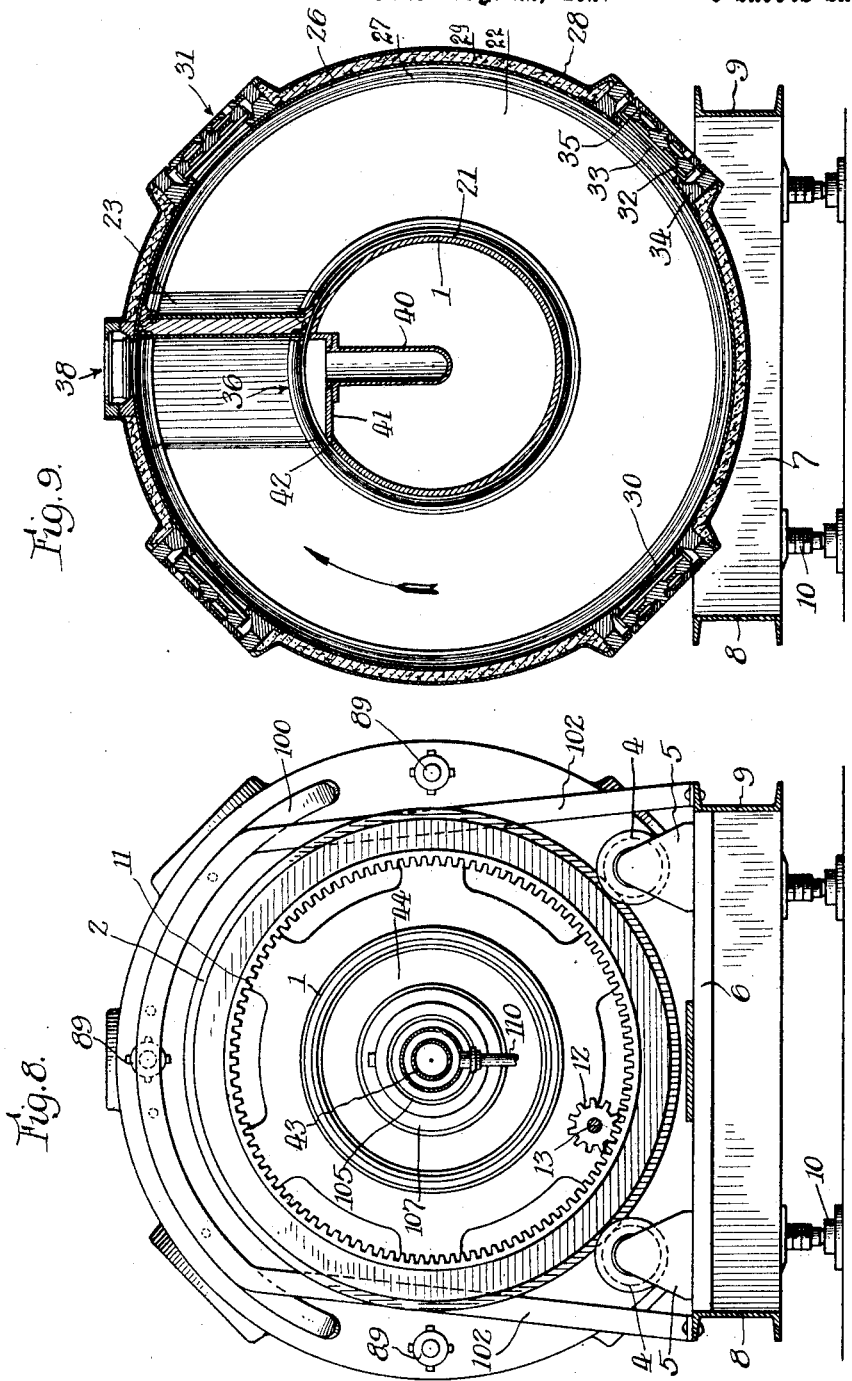

1,734,571

UNITED STATES PATENT OFFICE

JOSEPH H. GODFREY, OF CHICAGO, ILLINOIS, ASSIGNOR TO THE CREAMERY PACKAGE MFG. COMPANY, OF CHICAGO, ILLINOIS, A CORPORATION OF ILLINOIS

PASTEURIZING APPARATUS

Application filed August 22, 1927. Serial No. 214,624.

The invention relates to pasteurizing apparatus more particularly adapted for the treatment of edible fluids such as milk.

Experience in milk pasteurization has determined that the most effective and satisfactory method is to treat quantities of the milk at a predetermined temperature for a predetermined time in suitable containers or conduits. In the commonly practiced use of holding containers, the latter are filled with the liquid milk which is held at the required temperature for the required time and then emptied, the filling and emptying being controlled by valves. It will be obvious that any leakage or failure in these valves permits the uncontrolled flow to or from the container of a quantity of milk which has not been properly treated, and introduces the danger of reinoculation of the milk which has been properly pasteurized by the undestroyed bacteria in the milk which has escaped the prescribed treatment.

The continuous flow type of pasteurizing apparatus, wherein a continuous stream of the liquid milk is slowly conducted through relatively large heated conduits, is incapable of positive control to the end that every part of the liquid is treated at the required temperature for the required time, because of the more rapid flow of liquid currents within the larger stream which pass through the apparatus in less than the required time for the destruction of bacteria, and because of the retardation and over-treatment of quantities of milk lying or moving out of the direct current.

It is the principal object of this invention to provide pasteurizing apparatus which is positive in its control of every part of the milk under treatment, with the result that all of the milk is treated with certainty for not less than the required period of time at the required temperature to accomplish effective pasteurization.

Another object is to provide effective means in pasteurizing apparatus for positively determining the period of time that all portions of the milk is treated, without the use of controlling valves.

Another object is to provide in such apparatus for the positive separation into batches of quantities of milk in continuous movement during the treatment period.

Further objects include the provision of improved means for maintaining the temperature of the milk under treatment, and for handling the milk in its delivery to and discharge from the treating apparatus.

Other objects and advantages will be apparent in the following detailed description of a preferred embodiment of the invention which I have selected for illustration in the accompanying drawings. It will be understood, however, that various changes in form, construction and arrangement may be made by those skilled in the art, without departing from the scope and spirit of the invention as expressed in the appended claims. Reference is made also to my co-pending application Serial No. 147,738 filed November 11, 1926 of which this application is a continuation in part.

Referring to the drawings, Figure 1 is a side elevation of the apparatus, with a portion broken away to illustrate in vertical section the internal construction.

Fig. 2 is a plan view, with a portion of the outer casing broken away to illustrate the internal arrangement.

Fig. 3 is a front end view in elevation.

Fig. 4 is a sectional detailed view of an air valve used in the apparatus.

Fig. 5 is a rear end view in elevation, showing in section a part of the discharging mechanism.

Fig. 6 is a longitudinal sectional elevation of the front portion of the apparatus.

Fig. 7 is a longitudinal sectional elevation of the rear portion of the apparatus.

Figs. 8 and 9 are cross sectional views in elevation taken on the planes of the lines 8—8 and 9—9 respectively in Fig. 6.

Stated generally, the apparatus comprises a conduit series of coil chambers interconnected in substantially helical form and disposed around a central drum in which is contained a heating medium of regulated temperature, the drum and conduit rotating as a unit on a horizontal axis. The milk preferably is pre-heated by other means to approximately the required temperature for treatment, and then is introduced into the conduit in successive batches to a level below the upper path of travel of the conduit so that there is no intermixture between the batches in passing through the apparatus. The period of time for which each batch is held in the conduit, in passing through the apparatus at the maintained regulated temperature, is positively and accurately determined by the speed of rotation of the conduit, which is operated by regulated mechanical means.

More specifically described, with reference to the drawings, the numeral 1 indicates a preferably cylindrical drum of rigid structure which is supported for rotation on a horizontal axis by bearing rings 2 and 3 respectively mounted on the front and rear ends thereof. Each of the bearing rings 2 and 3 is operatively supported on a pair of rollers 4 pivotally mounted in brackets 5 rigidly secured to cross members 6 and 7 respectively of the supporting frame. Side beams 8 and 9 form the main members of the supporting frame, the latter being supported on a plurality of conventional adjustable legs 10 to permit leveling of the apparatus when installed.

Rotation of the drum is effected preferably by means of a ring gear 11 rigidly mounted on one of the bearing rings, in the present instance on the front ring 2. A pinion 12 (Fig. 8), having driving engagement with the gear 11, is mounted on a drive shaft 13. Any suitable means may be employed for actuating the drive shaft at uniform speed, that herein illustrated comprising a worm gear 14 (Fig. 1) mounted on the shaft 13 and in driven engagement with a worm 15 carried by a shaft 16 upon which is mounted a sprocket 17, the latter having driven connection through a chain belt 18 with an electric motor 19, the worm and worm gear preferably being housed in conventional manner as indicated at 20. With uniform speed in the motor 19, and proper ratio of speed reduction in the intermediate driving train, the ring gear 11 and drum 1 are rotated at a speed effecting precise time intervals for the pasteurization process hereinafter described.

The drum above described illustrates the preferred means of support for the pasteurizing conduit, which, in the present instance is formed thereabout, the drum being further utilized for containing a heating medium as hereinafter described. Other means of support and heat application may be used, however, without departing from the essential characteristics of the pasteurizing conduit herein disclosed.

The conduit may be constructed in true helical form, as illustrated in my copending application above referred to, or in any other form of continuous coils or series of interconnecting chambers through which milk may be caused to flow, by rotation of the structure, in positively separated batches and in determined periods of time. For effective performance and manufacturing convenience, I prefer the conduit construction herein illustrated. About the drum 1 preferably is secured a sheet covering 21 of a non-corrosive metal, forming a lining for the milk conduit. Erected thereupon are spaced partition plates 22 of similar material, extending radially from the covered drum and forming a longtiudinal series of like compartments or chambers.

The plates 22 do not completely encircle the drum, thus providing a gap or opening between the spaced ends thereof, the openings preferably being alined longitudinally of the drum. The opposite ends of the next successive partition plates are interconnected by angular partition plates 23 mounted on the drum covering, which together with the plates 22 form a continuous passage or conduit about the drum from end to end thereof approximating a helical coil. Full end plates 24 and 25 are provided, forming outer lateral walls for the respective end chambers, and a preferably cylindrical outer covering plate 26 encloses the entire series of chambers or conduit. Any suitable means for sealing the joints between the partition plates and the inner and outer cylindrical walls may be employed, as illustrated herein, base strips 27 are provided on the inner and outer walls, the strips having channels to receive the partition plates, and the whole being soldered or otherwise secured in assembly.

To minimize loss of heat by radiation through the exposed walls, an outer jacket 28 is provided about the outer and end walls of the conduit, the jacket being spaced from the walls and enclosing therebetween suitable insulating material 29.

Access for cleaning purposes, to all surface area of the interior of the conduit, is provided through a plurality of openings 30 in the outer wall and jacket. The openings as shown herein are arranged in four longitudinal series, from which ready access may be had to every part of the conduit for scrubbing and sterilizing the milk passage after use. Each of the openings 30 is normally closed by a removable door 31 of any desired construction suitable to seal the openings when the apparatus is in use. That herein disclosed comprises a door plate 32 (Fig. 9) having a non-corrosive inner covering 33 seated upon an opening frame structure 34 sealed to the wall of the conduit. A latch 35, centrally pivoted on the outer side of the door plate 32, is provided with spaced radial beveled edge lugs which engage by rotation of the latch plate with overlying spaced lugs formed on the outer margin of the frame structure 34, thus removably clamping the door in sealing contact with the opening frame structure.

The closed extremities of the two end chambers, comprising the respective ends of the continuous conduit, are provided with openings indicated at 36 and 37 through the drum 1, with which are respectively associated means for admitting milk to one end of the conduit in successive batches and in limited quantity to fill the lower portions of the turns of the conduit to a level substantially below the crest of the drum, and means for discharging the milk from the opposite end of the conduit when the milk has been passed through the length of the conduit by the rotation of the structure. Cleaning openings are provided in the outer wall and jacket, as indicated at 38 and 39, radially outward of the openings 36 and 37, the openings being provided with removable closures similar in construction to those described for the openings 30.

The means herein illustrated for controlling the admittance of the milk to the conduit, and for discharging it therefrom, is preferred. It is contemplated, however, that many equivalent arrangements of means for admitting milk or other edible liquid in successive separated quantities for pasteurization in a rotating conduit of continuous serial turns, may be made, as embraced in my invention. An advantage of the arrangement selected for illustration herein is that it permits the use of my pasteurizing apparatus between other purpose apparatus, commonly used in the treatment and packaging of milk and cream for consumption, which operate with a continuously flowing stream of the milk or cream.

The milk is admitted to the inlet end of the conduit through a radially disposed tube 40 extending inwardly of the drum. The tube 40 is joined to a cup shaped fixture 41 mounted in the drum wall and opening into the conduit and tube 40. The fixture 41 is constructed with a flat bottom wall which is perpendicular to the tube 40, and which is positioned, when the tube 40 is in vertical position, at the approximate level of the liquid in the conduit. In the rotation of the conduit structure, in the direction indicated by the arrow (Fig. 9), the marginal edge 42 of the fixture rises above the liquid level while the upper end of the tube 40 does not rise above that level maintained as hereinafter described. Consequently, as the edge 42 rises above the liquid level, there is an immediate and positive cut-off of the batch which has been last admitted and at the same time the milk flow continues through the tube 40 for the beginning of the next successive batch without interruption, the separation being maintained by the cylindrical crest of the drum.

The tube 40 is joined to a tube 43 positioned axially of the drum and extending outwardly of the end of the drum, the latter tube being rigidly supported in a head plate 44 secured within and effecting a sealed closure of the end of the drum. The outer end of the tube 43 communicates with the tubular outlet 45 of a level maintaining flow regulating device. The outlet 45 is stationary while the tube 43 rotates with the conduit structure, and to compensate for such oscillation as may occur between them a movable union is provided, preferably comprising a double socket member 46 in which are disposed in frictional engagement a pair of annular ball members mounted respectively on the ends of the tube 43 and outlet 45.

The outlet 45 is carried by an endwardly adjustable casing 47 having a passage 48 in communication with the outlet 45. A receiving reservoir 49 is mounted on the casing 47, to which the liquid milk or cream is preferably supplied in continuous flow through a pipe 50 entering the side of the reservoir. The reservoir communicates at its bottom with the passage 48, the opening thereinto being controlled by a valve 51 slidably mounted in a sleeve 52 mounted on the casing about the opening into the passage 48. The sleeve 52 is provided with lateral ports controlled by the position of the valve 51, the latter in lowermost position closing the ports and also seating upon the margin of the opening into the passage.

Between the reservoir 49 and outlet 45 is a float chamber 53 opening into the passage 48. A float 54 positioned in the chamber 53 is supported by a rod 55 extending upward of the chamber and pivotally connected to one arm of a lever 56 pivotally supported on the reservoir 49. The opposite arm of the lever 56 carries a pivoted rod 57 on the lower end of which is operatively supported the valve 51. A notched bar 58 is mounted on the lever 56, and adapted to carry a weight 59 which may be adjusted as to position in relation to the pivot fulcrum of the lever 56.

The float 54 thus controls the valve 51, the milk rising in the float chamber from the passage 48 and effecting the closure of the valve 51, through the linkage connecting it to the float, when the milk level rises to a maximum height substantially below the crest of the drum wall in the pasteurizing conduit, the adjustable weight being provided for accurate adjustment of that height. An end cap 60 is preferably mounted at the outer end of the passage 48, removable for cleaning purposes and secured by any suitable means, as by a yoke 61 and hand screw 62 mounted therein and engaging the cap to retain it in closed position.

It will here be apparent that by the maintenance of head of the milk in the passage 48 and tubes 43 and 40 at a level below the crest of the drum 1, the milk will flow into the conduit only to the height of that maintained level. Therefore, as the fixture 41 and the connecting tubes 40 and 43 rotate with the drum and conduit structure, the milk will begin flowing through the opening 36 into the inlet end of the conduit when the tube 40 has passed the vertical position and begins to descend. The flow will continue while the tube 40 is carried around and again approaches the vertical, the milk passing into the advancing conduit end and filling the first turn or chamber thereof to the controlled maximum level. As the tube 40 reaches the vertical position, the marginal edge 42 of the fixture 41 also reaches that level, and the further rotative movement carries the edge 42 above the maintained level, thus ending the filling of the one batch by interposing the crest of the drum adjacent the edge 42, and beginning the filling of the next batch. The first batch then begins its flow through the angular passage into the next turn or chamber with the continued rotation of the conduit, the successive batches being at all times positively separated, throughout their travel through the pasteurizing conduit, by the crest of the cylindrical drum wall. It will thus be seen that there is no possibility of the liquid contents of conduit passing through the conduit in less time than is determined by the speed of rotation of the conduit, and that there is no possibility of leakage or by-passing through faulty valves or otherwise which permits the escape of any part of the batches of milk from treatment for the full period of time.

In maintaining the maximum level of liquid milk through operation of the valve 51, it is desirable to provide excess capacity in the reservoir 49 so that variations in the rate of flow through the tube 40, due to the retardation of flow as the latter passes through its upper arc of movement, may be compensated for by a rising level of milk in the reservoir without disturbing the rate of flow in the inlet pipe 50.

Liquid tight engagement without undue friction between the socket member 46 and the engaging members carried by the tube 43 and outlet 45, is preferably maintained by mounting the casing 47 on a longitudinally slidable support with resilient means tending to force it inwardly toward the member 46. The casing 47 is mounted on a plate 63 having operative bearing support on a stationary block 64, the latter having a central slot 65 in its forward lower portion, and carrying a pair of upwardly extending spaced slideways 66 upon which rests the plate 63. A pair of slide bars 67 rigidly secured to the plate 63 cooperatively engage the slideways 66, thus permitting longitudinal movement of the casing while preventing lateral displacement. The block 64 is rigidly secured, as herein illustrated, to a horizontal section of channel 68 fixed upon an upright standard 69 mounted on one of the frame members, and braced by a rearward support 70 to another frame member.

Bearing upon the front edge of the plate 63, and tending to move it inwardly upon the slideways 66, is a draw link 71 extending into the slot 65 and having pivotal attachment to one end of a lever 72, pivoted on a pin 73 mounted between the flanges of the channel 68. The lower end of the lever 72 pivotally connects with a push rod 74 extending into a housing 75 mounted on the standard 66, and containing a compression spring 76 bearing outwards upon a cross member carried by the rod 74. The casing 47 and its supported structures may be removed for cleaning by dropping the link 71 from contact with the plate 63 and withdrawing the casing from its under supports.

Tubular connections at the rear end of the apparatus are provided for discharging the successive batches of milk from the pasteurizing conduit, of similar construction and operating in similar but reversed manner to control the outflow of milk. A fixture 77 is positioned at the outlet opening 37 in the rear extremity of the conduit, and opens into a radially positioned tube 78 joined to an axial tube 79 rigidly supported in a head plate 80 closing and rigidly supported in the rear end of the drum.

The outer end of the tube 79 terminates over a discharge reservoir 81, suitably supported thereunder, and preferably provided with an inclined pipe 82 to receive the discharged milk, the latter conducting the flow to the bottom of the reservoir and avoiding excessive frothing of the milk by impact with the surface of liquid in the reservoir. A regulated uniform flow from the reservoir 81, in compensation for the batch discharges thereinto, is accomplished by float valve control comprising a tubular outlet 83 having an end closure and extending into a float chamber 84 positioned laterally of the reservoir. The outlet 83 is provided with lateral ports 85 controlled by a rotatable sleeve valve 86 mounted on the outlet and actuated by a float 87 positioned in the chamber 84. An outlet pipe connection 88 leads from the chamber 84, and as the desired uniform liquid level in the chamber 84 is drawn down, the float valve operates to admit more liquid from the reservoir, thus providing uniform flow to the next apparatus in line.

In the passage of the batches of milk through the pasteurizing conduit, it is obvious that air spaces exist in the upper portions of the conduit coils between the separated batches. The introduction and discharge of the air between the batches of milk, without disturbing the maintained level of liquid in the conduit, is accomplished by means of automatic valves positioned in the respective end walls of the conduit.

At the front or inlet end of the conduit, an air valve is positioned in communication with the extreme end of the conduit, and preferably three other valves are provided at ninety degree intervals about the end wall of the conduit. As each valve in its upward travel passes the maintained liquid level, the valve is automatically opened, and in its opposite downward movement, the valve is closed as it approaches the liquid level. By this means, air is admitted as the inlet end of the conduit rises above the liquid level, and the liquid is permitted to assume normal gravity level without disturbance by the continued advance of the conduit end, which without such atmospheric relief would tend to draw the liquid over the crest of the drum. The plurality of air inlet valves assure a complete balance between liquid and air spaces in the progress of the batches through the apparatus.

At the discharge end of the conduit, one air outlet valve suffices, the air being discharged from the end of the conduit as the latter approaches the liquid level, thus permitting the milk to travel to the end of the conduit without disturbance of the normal gravity level in the conduit.

The preferred construction of air valve is indicated generally at 89 and is illustrated in detail in Fig. 4. Referring to the latter figure, a tubular casing 90 is mounted in the end wall and outer jacket of the conduit, in sealed relation thereto, within which is positioned an inner valve casing 91 removably seated at its inner end in abutment with a marginal flange provided on the outer casing 90. A union nut 92, overlying a peripheral flange formed on the casing 91 and having screw-threaded engagement with the outer casing 90, secures the inner casing in normal position.

At the inner end of the casing 91 a conventionally seated poppet valve 93 controls the air passage 94, and is supported on a stem 95 extending outward through the passage. A head 96 fixed on the stem 95 confines a compression spring 97 against a cap 98 abutting the outer end of casing 91, the spring tending to retain the valve in closed position. An opening in the cap 98 accommodates the stem 95 and is of substantially larger diameter to admit air to the passage 94. The outer end of the air passage is preferably filled with filtering material 99 to remove impurities from the air entering the pasteurizing conduit.

The valves 89 are operated by front and rear cam bars 100 and 101 respectively, adapted to engage and depress the valve heads 96. The cam bars are positioned to engage the valve heads while the valves are passing above the liquid level, and to release them while passing below the liquid level. The bars are preferably supported on standards 102 mounted on the main frame members.

For the maintenance of uniform temperature of the desired degree in the milk under pasteurizing treatment in the conduit, means are provided for circulating water of regulated temperature through the interior of the drum 1. Each of the head plates 44 and 80 is provided a series of radial passages 103 inwardly communicating with the interior of the drum and leading to a chamber 104 formed in the hub portion of the head plate about the respective tubes 43 and 79. Rotatably mounted on the respective tubes 43 and 79 is a sleeve 105 having endward bearings on the tubes. The intermediate portion of the sleeve is substantially spaced from the tube to form an annular chamber communicating at its inner end with the hub chamber 104.

The sleeve 105 remains stationary while the respective tubes passing therethrough rotate with the drum. Upon the hub portion of each of the head plates 44 and 80 is provided a collar 106 concentric with and spaced from the inner end of the sleeve, the space accommodating packing. A conventional gland nut 107 is threaded on the collar 106. A similar packing gland construction is provided at the outer end of the sleeve 105 and indicated at 108. Each of the sleeves 105 is held against rotation with its respective supporting tube by a rigid strap 109 secured to the side of the sleeve and extending downward into attachment with a stationary portion of the frame structure.

Secured to the front sleeve 105, and communicating with the annular chamber therein, is a water pipe 110 leading to the suction side of a centrifugal pump 111 operated by a motor 112. A pipe 113 leads from the discharge side of the pump 111 to the rear end of the apparatus and is connected with the sleeve 105 on the discharge tube 79, thus completing a circuit for circulation of water through the drum 1 by the pump 111.

The water may be heated by injection of steam. A preferable arrangement as herein disclosed comprises a supply pipe 114 leading from a source of steam and having an automatic temperature controlled throttle 115 regulated by a therometric connection 116 with an adjacent portion of the water circulation pipe 113. Steam from the throttle 115 is passed through a pipe 117 to the forward end of the apparatus and there admitted to the water pipe 113 through a suitable valved injector 118, the water being tempered thereby in its return to the rear end and entry into the drum. Surplus water in the circulating system, caused by the added steam condensate, may be discharged through a riser pipe 119 connected with the pipe 113 and leading to any convenient place of discharge.

For record of the maintenance of temperature in the milk during the pasteurizing treatment, a recording thermometer 120 may be mounted conveniently on the discharge float chamber 84, and connected with a thermometer 121 installed in the milk discharge reservoir 81.

It will here be apparent that the apparatus described accomplishes the positive time-controlled pasteurization treatment of the milk, cream or other edible liquid passed through the conduit, the time period being regulated by the speed of rotation of the conduit, and without possibility of intermixture of the milk in one batch with that of another batch, as the successive batches are positively separated at all times by the crest of the revolving drum forming a wall of the conduit.

I claim as my invention:

1. Pasteurizing apparatus, comprising a conduit of substantially helical form arranged for rotation about its axis and adapted to carry separated batches of liquid in the lower turns thereof whereby said batches are progressively moved through said conduit by the rotation thereof.

2. Pasteurizing apparatus, comprising a conduit formed of a series of successively interconnected coils rotatable about a common axis and adapted to carry separated batches of liquid in the lower turns of said coils with the level of said batches below the upper path of travel of said coils whereby the rotation of said coils moves said batches therethrough in constantly separated relation.

3. Pasteurizing apparatus, comprising a rotatable liquid container having a series of progressively connected chambers arranged about its axis to form a conduit for the gravital movement of liquid therethrough with the rotation of said container, said liquid being contained in separated batches in said chambers while said chambers are moving through the lower arcs of their paths of movement and being maintained at a level below the upper arcs of their paths of movement.

4. Pasteurizing apparatus, comprising a conduit of substantially helical form arranged to rotate about its axis, and means for intermittently admitting liquid into said conduit whereby separated batches of liquid are carried in the lower turns of said conduit and are progressively moved through said conduit with the rotation thereof.

5. Pasteurizing apparatus, comprising a conduit forming a series of successively interconnected coils rotatable about a common axis, and means for admitting liquid into said conduit in batches, said batches being carried in the lower turns of said coils with an upper level below the upper path of travel of said coils whereby the rotation of said coils moves said batches therethrough in separated relation.

6. Pasteurizing apparatus, comprising a conduit having the form of a series of successively connected similar turns rotatable about a common axis at a predetermined speed, and means for admitting successive batches of liquid into said conduit in quantities limited to levels below the highest path of travel of said turns whereby the liquid batches successively move through said turns in separated relation during a predetermined period of time.

7. Pasteurizing apparatus, comprising a rotatable liquid container having a series of progressively connected chambers arranged about its axis to form a conduit for the gravital movement of liquid therethrough with the rotation of said container, and means for admitting a limited quantity of liquid to the endmost chamber while said chamber is moving through the lower arc of its path of movement.

8. Pasteurizing apparatus, comprising a heated conduit of substantially helical form arranged to rotate about its axis, and means for intermittenty admitting liquid into said conduit whereby separated batches of liquid are carried in the lower turns of said conduit and are progressively moved through said conduit with the rotation thereof.

9. Pasteurizing apparatus, comprising a heated conduit forming a series of successively interconnected coils rotatable about a common axis, and means for admitting liquid into said conduit in batches, said batches being carried in the lower turns of said coils, with an upper level below the upper path of travel of said coils whereby the rotation of said coils moves said batches therethrough in separated relation.

10. Pasteurizing apparatus, comprising a uniformly heated conduit having the form of a series of successively connected similar turns rotatable about a common axis at a predetermined speed, and means for admitting successive batches of liquid into said conduit in quantities limited to levels below the highest portion of the path of travel of said turns whereby the liquid batches successively move through said turns in separated relation during a predetermined period of time.

11. Pasteurizing apparatus, comprising a rotatable holding container for heated liquid having a series of progressively connected chambers arranged about its axis to form a conduit for the gravital movement of said liquid therethrough with the rotation of said container, and means for admitting a limited quantity of said liquid to the endmost chamber while said chamber is moving through the lower arc of its path of movement.

12. Pasteurizing apparatus, comprising a conduit forming a series of successively connected coils rotatable about a common axis and adapted for the gravital movement of liquid therethrough with the rotation of said coils, means for admitting a quantity of liquid to one end of said conduit while said end is moving through the lower arc of its path of movement, and means for admitting air to said end of the conduit while said end is moving through the upper arc of its path of movement.

13. Pasteurizing apparatus, comprising a conduit forming a series of successively connected coils rotatable about a common axis and adapted for the gravital movement of liquid therethrough with the rotation of said coils, means for admitting a quantity of liquid to one end of said conduit while said end is moving through the lower arc of its path of movement, and means for admitting air to said end of the conduit while said end is moving through the upper arc of its path of movement.

14. Pasteurizing apparatus, comprising a rotatable drum, a liquid conduit mounted upon said drum in the form of coils having a common axis with said drum, and means for admitting successive batches of liquid to one end of said conduit for gravital movement therethrough with the rotation of said drum and coils.

15. Pasteurizing apparatus, comprising a rotatable drum, a liquid conduit mounted on said drum forming a continuous series of coils having a common axis with said drum, means for admitting successive quantities of liquid to one end of said conduit while said end is moving through the lower portion of its path of movement, and an automatic valve controlling atmospheric communication with said conduit at said end, said valve being operable to admit air to said conduit only during the movement of said end through the upper portion of its path of revolution, thereby introducing air between the successive quantities of liquid in said conduit.

16. Pasteurizing apparatus, comprising a rotatable drum, a liquid conduit mounted about said drum forming a continuous series of coils having a common axis with said drum, an inlet tube positioned axially in said drum and having a radial extension communicating with one end of said conduit, a liquid supply reservoir communicating for gravity flow with the axial portion of said inlet tube, the liquid level in said reservoir being limited in height to that below the uppermost side of said drum, thereby causing liquid to flow into said conduit only when the said end thereof moves below said liquid level, and means for admitting air to said conduit when said end moves above said liquid level.

17. Pasteurizing apparatus, comprising a conduit forming a series of successively connected coils rotatable about a common axis and adapted for the gravital movement of liquid therethrough with the rotation of said coils about their axes, a tube positioned in axial relation to said conduit having connection with one end thereof to form a liquid inlet, means for supplying liquid to said axial tube by gravity flow under a head less than the height of the underside of the uppermost portion of the path of movement of said coils, thereby admitting liquid to said conduit in successive separated batches.

18. Pasteurizing apparatus, comprising a conduit forming a series of successively connected coils rotatable about a common axis and adapted for the gravital movement of liquid therethrough with the rotation of said coils about their axis, a tube positioned in axial relation to said conduit having connection with one end thereof to form a liquid inlet, means for supplying liquid to said axial tube by gravity flow under a head less than the height of the underside of the uppermost portion of the path of movement of said coils, thereby admitting liquid to said conduit in successive separated batches, and means for receiving liquid flowing from the other end of said conduit.

19. Pasteurizing apparatus, comprising a rotatable drum, a liquid conduit mounted on said drum forming a continuous series of coils having a common axis with said drum, means for admitting successive quantities of liquid to one end of said conduit while said end is moving through the lower portion of its path of movement, means for admitting air between the successive quantities of liquid, means for discharging said successive quantities of liquid from the other end of said conduit while said other end is moving through the lower portion of its path of movement, and an automatic valve controlling atmospheric communication with said conduit at said latter end, said valve being operable to permit the discharge of air from said conduit only during the movement of said latter end through the upper portion of its path of movement thereby discharging the air between the successive quantities of liquid and the latter end of said conduit as said batches move into said latter end.

20. Pasteurizing apparatus, comprising a rotatable drum, a liquid conduit mounted about said drum forming a continuous series of coils thereabout, means for admitting successive batches of liquid to one end of said conduit, the level of said batches of liquid being limited in height to that below the uppermost side of said drum, means for admitting air between said batches of liquid, an outlet tube positioned axially in said drum and having a radial extension communicating with the outlet end of said conduit, thereby causing the liquid to flow out of said conduit only when said outlet end moves below said liquid level, and means for successively discharging the air between said batches from said conduit when said outlet end moves above said liquid level.

21. Pasteurizing apparatus, comprising a conduit forming a series of successively connected coils rotatable about a common axis and adapted for the gravital movement of liquid therethrough with the rotation of said coils about their axis, a tube positioned in axial relation to said conduit having connection with one end thereof to form a liquid inlet, another tube positioned in axial relation to said conduit having connection with the other end thereof to form a liquid outlet, means for supplying liquid to said inlet tube by gravital flow under a head less than the height of the underside of the uppermost portion of the path of movement of said coils, thereby admitting liquid to said conduit in successive separated batches, said batches being maintained in separated relation while in said coils and successively discharged therefrom through said outlet tube.

22. Pasteurizing apparatus, comprising a cylindrical drum operatively supported for rotation on a horizontal axis, radially positioned spaced plates mounted on said drum to form a substantially helical conduit thereabout, outer covering plates enclosing said conduit, a tube axially positioned at one end of said drum and extending outwardly therefrom, said tube having a connection with one end of said helical conduit, an axial tube positioned outwardly of the other end of said drum and having connection with the other end of said conduit, said tubes and conduit being adapted for the passage therethrough of liquid.

23. In pasteurizing apparatus, a helical conduit supported for rotation upon its axis and adapted for the movement therethrough of liquid, means for admitting liquid to one end of said conduit in successive quantities to a level below the underside of the uppermost path of movement of the coils of said helical conduit, an air port in said end of said conduit, a valve controlling said air port, and cam means for operating said valve adapted to open said air port when the said end of said conduit passes above the level of said liquid and to close said air port when the said end of said conduit passes below the level of said liquid.

24. In pasteurizing apparatus, a helical conduit supported for rotation upon its axis and adapted for the movement therethrough of liquid, means for admitting liquid to one end of said conduit in successive quantities to a level below the upper portion of the path of movement of the coils of said helical conduit, an air port in said end of said conduit, a valve controlling said air port, and automatic means for operating said valve adapted to open said air port when the said end of said conduit passes above the level of said liquid and to close said air port when the said end of said conduit passes below the level of said liquid.

25. Pasteurizing apparatus, comprising a substantially helical conduit rotatable at a predetermined speed and having an inlet and an outlet for the passage of liquid therethrough, and means for limiting the level of the liquid within said conduit.

26. Pasteurizing apparatus, comprising a substantially helical conduit rotatable at a predetermined speed and having an inlet and an outlet, means for introducing liquid through said inlet in successive batches of limited quantity, and means for introducing air into said conduit alternately to said batches of liquid.

27. Pasteurizing apparatus, comprising a substantially helical rotatable liquid conduit having means for a controlled flow of liquid thereto, a plurality of spaced openings in the wall of said conduit, and removable covers normally mounted in sealing relation to said openings.

28. Pasteurizing apparatus, comprising a rotatable conduit of substantially helical form adapted to contain liquid in separated batches and having an axial supply tube communicating with one end thereof, a reservoir for supplying liquid to said tube, and float controlled valve means for regulating the flow from said reservoir to said tube, said means being adapted to limit the maximum level of liquid admitted to said conduit.

29. In pasteurizing apparatus having a substantially helical conduit rotatable on its longitudinal axis, an inwardly extending radial tube rotatable wtih said conduit and adapted to supply liquid thereto from a supply of predetermined level, and a cup-shaped member forming intermediate communication between said tube and the inner wall of said conduit, said cup-shaped member having its bottom wall perpendicular to the axis of said tube and positioned substantially at the level of the liquid to be supplied to said conduit, said bottom wall being extended at its rear side into intersection with the inner wall of said conduit.

30. In pasteurizing apparatus having a substantially helical conduit adapted to receive liquid at one end in successive separated batches at a predetermined level, means for admitting air to said conduit between said separated batches comprising a valve positioned in the wall of said conduit, means for opening said valve when said valve rises above the level of the liquid admitted to said conduit, and means provided in said valve for filtering the air passing through said valve.

31. Pasteurizing apparatus comprising a means for conducting separated batches of liquid in continuous progressive movement therethrough, means for receiving a continuously flowing stream of liquid and delivering said liquid in separated batches to said conducting means, and means for receiving said separated batches of liquid from said conducting means and discharging said liquid in a continuously flowing stream.

In testimony whereof, I have hereunto affixed my signature.

JOSEPH H. GODFREY.